Sept. 16, 1958 H. WEISS 2,852,732
HALL VOLTAGE GENERATORS
Filed March 3, 1955

INVENTOR
HERBERT WEISS

United States Patent Office 2,852,732
Patented Sept. 16, 1958

---

2,852,732

HALL VOLTAGE GENERATORS

Herbert Weiss, Nurnberg, Germany, assignor to Siemens-Schuckertwerke Aktiengesellschaft, Berlin-Siemensstadt and Erlangen, Germany, a corporation of Germany Application March 3, 1955, Serial No. 491,976

Claims priority, application Germany April 1, 1954

9 Claims. (Cl. 323—94)

My invention relates to Hall voltage generators, i. e. to electric semiconductor devices that generate across a resistance member of semiconductor material a variable voltage due to the simultaneous effects of electric current flowing through the member and of a magnetic field acting upon the member. This voltage (Hall voltage) occurs between two Hall electrodes of conductive material which are mounted on the semiconductor member and usually are so located as to lie on respective equipotential points when the semiconductor member is not subjected to the magnetic field. That is, the Hall voltage is zero when the strength of the magnetic field is zero, but assumes a finite value when the magnetic field has a component of finite strength perpendicular to the direction of the electric current flowing through the semiconductor member.

In the known devices of this kind, the Hall electrodes are point electrodes. That is their dimension in the current-flow direction is of a smaller decimal order of magnitude than the length of the semiconductor body and does not appreciably exceed the thickness of the body in the magnetic-field direction. The Hall voltage of such a device at no load is proportional to the strength of the magnetic field acting upon the semiconductor body. When applying the Hall voltage to a load, however, the proportionality is lost due to the fact that the internal resistance of the semiconductor member increases with an increase in magnetic field strength. More accurately, the increase in Hall voltage under load is less than proportional to the magnetic field. This phenomenon is disturbing and undesirable for various practical applications. Another particularity of such devices is due to the fact that the permeability of the ferro-magnetic material of the magnetic field structure decreases with increasing values of excitation. As a result, the field strength and the generated Hall voltage may not be proportional to the applied field excitation.

It is an object of my invention to minimize or eliminate such deficiencies.

Another object of my invention is to devise a Hall generator whose Hall electrodes have their geometric shape and dimensions so designed as to attain an arcuate, drooping Hall-voltage characteristic instead of a straight-line characteristic.

To achieve these objects, and in accordance with my invention, I replace the customary Hall-electrode points by line or area contact so that the Hall electrodes become extended along the semiconductor body preferably in the flow direction of the primary current passing through the body. That is, in a Hall voltage generator according to my invention the length of the Hall electrodes is no longer negligible but is in the same order of magnitude as the length of the semiconductor body in the current-flow direction. According to a more specific feature, the length of the Hall electrodes is larger than one tenth of the length of the body and larger than double the thickness of the body. In some embodiments of the invention, the length of the Hall electrodes along an elongated semiconductor body approaches or exceeds the width of the wafer.

As a result, the characteristic of the Hall voltage versus the strength of the magnetic field acting upon the semiconductor is no longer a straight line but follows a drooping curve of such shape that the no-load Hall voltage, within a certain range of field strength values, increases more than in linear proportion to the field strength. This permits compensating, within that range of field strength values, the tendency of the Hall voltage to drop under load conditions or as a result of the above-mentioned decreases in magnetic permeability.

These and more specific objects, advantages and features of my invention will be apparent from the following description in conjunction with the drawings in which.

Figure 1:
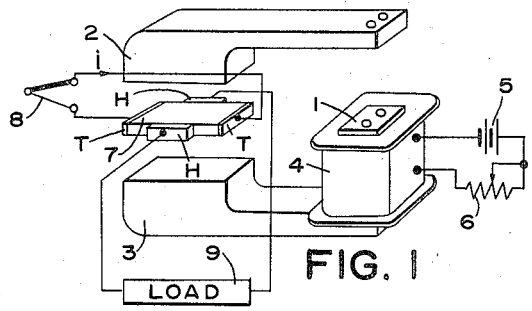
Fig. 1 shows schematically and in perspective an exploded view of a Hall generator according to the invention.
Figure 2:
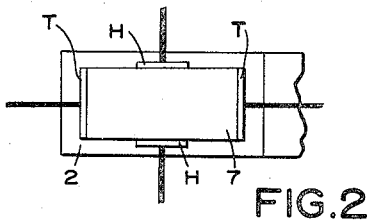
Fig. 2 is a view onto the semiconductor member of the same generator.

The Hall generator illustrated in Figs. 1 and 2 comprises a magnet structure 1 with two pole pieces 2 and 3. The magnet structure carries an excitation coil 4 to be energized from a current source 5 through a rheostat 6 to produce an adjustable or variable magnetic field strength in the gap between the two pole pieces.

Located within the gap is a resistance member 7 consisting of a rectangular, thin body or wafer of semiconductor material. The semiconductor member 7 has terminal electrodes connected to a current source here exemplified by a thermo-couple 8. During operation the member 7 is traversed by a variable current $i$ flowing between the terminals T in a direction perpendicular to that of the magnetic field.

The semiconductor member 7 is further equipped with two Hall electrodes H located on the respective long sides of the member. The Hall electrodes are shown connected to a current consuming load 9 which may consist, for instance, of the input stage of a power amplifier. An example of such an amplifier is described below with reference to Fig. 7. However, the circuit of the Hall electrodes may also be connected to a voltage compensating network depending upon the particular purpose to which the Hall generator is to be applied.

While in Fig. 1 the pole pieces 2 and 3 are shown separated from each other, the gap formed between their respective pole pieces is preferably made as narrow as possible. To this end the pole faces are preferably covered by an insulating coating (not illustrated) directly contacting the semiconductor member 7. The insulating coating may consist of magnetizable ferrite material to prevent weakening of the magnetic field.

As explained below, the semiconductor material of member 7 preferably consists of a compound of higher carrier mobility than obtainable with elementary substances such as silicon or germanium. For instance, in the illustrated generator the member 7 may consist of a monocrystalline body of indium antimonide or indium arsenide. When using such materials, suitable dimensions of the body are, for instance, 8 to 15 mm. length, 3 to 8 mm. width, and 0.1 to 0.5 mm. thickness.

The elongated shape of the Hall electrodes H in a generator according to Figs. 1 and 2 is essential for achieving the particular voltage characteristic desired by the present invention. As shown, the length of the Hall electrodes H measured in the flow direction of the primary current $i$ between the terminals T is of the same decimal order of magnitude as the length of the semiconductor member. That is, the length of the Hall electrodes is double or more the thickness of the member and may approach or exceed the width of the member. Consequently, the Hall electrodes form with the semiconductor body a line or area contact rather than a point contact.

Figure 3:
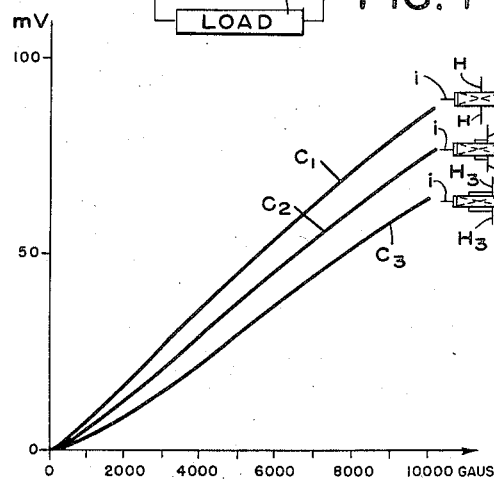
Fig. 3 is a coordinate diagram explanatory of the performance of Hall generators according to the invention.

The effect of extended length of the Hall electrodes is exemplified by the result indicated in the coordinate diagram of Fig. 3. The diagram shows three curves $C_1$, $C_2$ and $C_3$ representing Hall voltage in millivolts (mv.) versus magnetic field strength in gauss.

For identification, three semiconductor members are illustrated adjacent to the respective voltage characteristics. All three semiconductor members consist of the same material, namely indium antimonide, and have the same dimensions, namely 15 x 4 x 0.4 mm. The Hall electrodes of the semiconductor member corresponding to the characteristic $C_1$ have a length of 0.5 mm. which is equal to the thickness of the semiconductor body. The characteristic $C_1$ obtained with such point electrodes is essentially a straight line, that is the Hall voltage is proportional to the magnetic field strength.

The Hall electrodes $H_2$ of the semiconductor member corresponding to the characteristic $C_2$ have a length of 2 millimeters. The Hall electrodes $H_3$ of the third semiconductor member, corresponding to the characteristic $C_3$, have a length of 5 millimeters, thus being longer than the terminals T or the width of the member. All three characteristics require a primary direct current of 100 milliamperes flowing between terminal T through each member.

It will be recognized from Fig. 3 that the Hall voltage, under otherwise identical conditions, decreases with increasing length of the Hall electrodes in such a manner that the decrease in Hall voltage is greater at small values of magnetic field strength than at larger values. The deformation of the characteristics $C_2$ and $C_3$, compared with the straight-line characteristic $C_1$ of point electrodes, is such that the curves assume a drooping shape. As a result, the no-load voltage along curves $C_2$ and $C_3$ increases with increasing magnetic field strength in more than proportional relation to that field strength. This is the reason why Hall generators having a voltage characteristic as exemplified by curves $C_2$ and $C_3$ afford a compensation of the voltage drop that would otherwise occur when the Hall voltage is applied to a current-consuming load. As mentioned, the same effect can also be used for causing the Hall voltage to remain proportional to the excitation current (from source 5 in Fig. 1) of the magnet when operating in a range of the characteristic wherein the permeability of the iron or other ferromagnetic material of the magnet structure decreases with increasing field excitation.

According to another feature of my invention, the Hall generators are so designed that their voltage characteristic can be selectively adapted to different magnitudes of current load. To this end, the semiconductor member of the Hall generator is provided with a plurality of Hall electrode pairs of respectively different geometric shape, or with a plurality of semiconductor members having different respective pairs of Hall electrodes. Embodiments of this kind are illustrated in Figs. 4 and 5.

Figure 4:
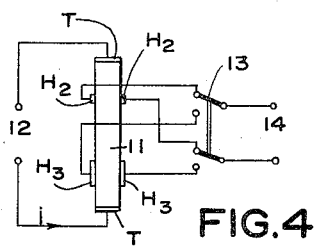
Figs. 4 and 5 show schematically two different embodiments of Hall generators according to the invention which permit selecting one of a plurality of voltage characteristics depending upon the particular requirements of intended application.

According to Fig. 4 a semiconductor member 11 of elongated shape has its terminals T connected to input terminals 12 so as to be traversed by primary current $i$. Member 11 is equipped with two pairs of Hall electrodes $H_2$—$H_2$ and $H_3$—$H_3$. The two electrodes $H_2$ are shorter than the electrodes $H_3$ in the current flow direction. For instance, the electrodes $H_2$ may secure a voltage characteristic similar to that of curve $C_2$ in Fig. 3 and the electrode $H_3$ may secure a voltage characteristic similar to curve $C_3$. The two electrode pairs are selectively connectable with output terminals 14 by means of a selector switch 13. However, it is sufficient, in cases where the Hall generator once adapted to a particular use need not change its voltage characteristic for various applications, to simply provide the electrode pairs with respective pairs of leads of which only one lead pair is to be connected to the output circuit.

The magnetic field system is omitted in Fig. 4, it being understood that it may correspond to that exemplified by Fig. 1.

Figure 5:
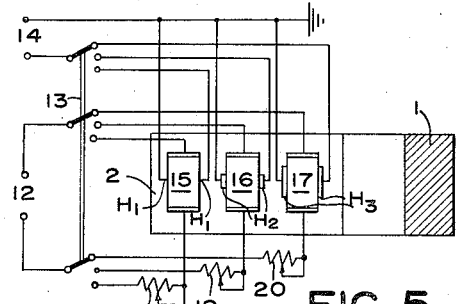

In the embodiment of Fig. 5, three semiconductor members 15, 16, 17 of the same material and size are subjected to the same field of a magnet structure 1 and are selectively connectable by a switch 13 to the input terminals 12 for the supply of primary current. Member 15 has point electrodes $H_1$ to provide a voltage characteristic of the type represented by curve $C_1$ in Fig. 3. Member 16 has elongated Hall electrodes $H_2$ to provide a voltage characteristic similar to curve $C_2$, and member 17 has still longer Hall electrodes $H_3$ to provide a characteristic similar to curve $C_3$ in Fig. 3. The switch 13 also connects the Hall electrodes of the one selected semiconductor member with the Hall-voltage terminals 14. One of the terminals 14 and the one Hall electrode of each member connected therewith may be kept at a fixed reference potential, this being exemplified by showing a ground connection. One or more calibrating resistors, as shown at 18, 19 and 20, may be provided for equalizing purposes, if necessary. The selector switch 13 may be omitted if the Hall generator is to be permanently connected for operation with a voltage characteristic that need not be changed once it has been properly selected.

It will be understood that a semiconductor member according to Fig. 4 may be equipped with more than two pairs of Hall electrodes, and that such a member may be replaced by a series connection of individual members each having only one pair of Hall electrodes of a length different from that of the electrode pairs of the other members. Analogously, the number of semiconductor members used in a selectively adjustable generator according to Fig. 5 may be reduced or increased, or the individual members may be serially disposed relative to the magnetic field rather than in the illustrated magnetic parallel relation.

As mentioned, the elongation of the Hall electrodes causes a reduction in available output voltage. If desired, however, the output voltage of the generator can be increased by voltage multiplying connections as disclosed in my copending application, Serial No. 468,099, filed November 10, 1954, for Electric Semiconductor Devices assigned to the assignee of the present invention. Examples of such voltage multiplying connections as applied in conjunction with the present invention are illustrated in Figs. 6 and 7.

Figure 6:
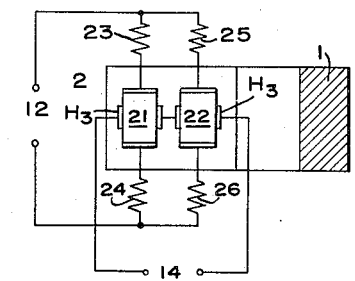

According to Fig. 6 two semiconductor members 21, 22 are disclosed in the field of a magnet structure 1 and are electrically connected to input terminals 12 in electric parallel relation to each other. Each semiconductor member is disposed between two resistors 23 and 24, or 25 and 26. The two semiconductor members 21 and 22 have equal resistance. The resistors 23 to 26 have equal resistance among themselves. This resistance may be five times larger, for instance, than that of the individual members 21 and 22. The resistors 23 to 26 may consist of any ohmic type, but they may also consist of the same semiconductor material, for instance indium arsenide, as the members 21 and 22, except that resistors 23 to 26 are not provided with Hall electrodes and are not subjected to a magnetic field.

The Hall electrodes $H_3$ of members 21 and 22 have elongated shape as explained above and are all of equal length. These electrodes are all series connected to the output terminals 14. During operation, a Hall voltage of the desired drooping characteristic appears across each pair of Hall electrodes, and the two Hall voltages are connected with each other in the additive sense so that the output voltage across terminals 14 has twice the magnitude of each individual Hall voltage generated. As in the embodiment of Fig. 4, the two members 21 and 22 may be serially disposed with respect to the magnetic field acting upon them; and as explained in the above identified copending application, any desired larger number of semiconductors may be used for securing a correspondingly multiplied output voltage.

Figure 7:
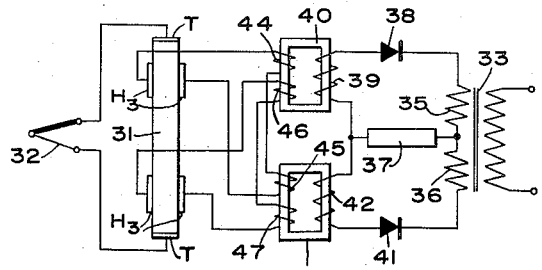
Figs. 6 and 7 show schematically two further embodiments respectively of the invention.

In the embodiment of Fig. 7, a semiconductor member 31 subjected to a magnetic field (not shown) is provided with two pairs of Hall electrodes of $H_3$ of the same length. The member 31 is traversed by current from a source 32 shown as a thermo-element. The two pairs of Hall electrodes are connected to the input circuit of a current consuming load exemplified by the input stage of a magnetic amplifier.

The magnetic amplifier is energized from an alternating-current line through a transformer 33 with two series-connected secondary windings 35 and 36. A load 37 has one end connected to the midpoint between the secondaries 35 and 36. The other end of load 37 is connected to winding 35 through a rectifier 38 in series with the alternating-current main winding 39 of a saturable reactor 40. The same end of load 37 is connected to winding 36 through a rectifier in series with the winding 42 of another saturable reactor 43. Each reactor has two premagnetizing control coils. The control coils 44 and 45 of respective reactors 40 and 43 are both connected to one pair of Hall electrodes $H_3$. The control coils 46 and 47 of respective reactors 40 and 43 are connected to the second pair of Hall electrodes $H_3$. The poling of coils 44 and 46 is such that the excitation in both is cumulative so that their joint effect upon the reactor 40 corresponds to the sum of the two Hall voltages. The same applies to coils 45 and 47.

The above-described modifications, namely the provision of more than three electrode pairs or the separation of the semiconductor member into a plurality of individual members each having only one pair of Hall electrodes, are also applicable to devices of the type represented by Fig. 7.

It has been mentioned above that the semiconductor members in Hall voltage generators according to my invention preferably consist of compounds having a higher carrier mobility than elementary semiconductors. More specifically, the carrier mobility should be a minimum of about 6000 cm.$^2$/volt second. "Carrier mobility" is defined as the velocity of the electric carriers within the semiconductive substance in centimeters per second in an electric field of one volt per centimeter. One and the same semiconductor substance may exhibit (n-type) conductance by excess electrons or negative carriers, or (p-type), conductance by defect-electrons (holes) or positive carriers, depending upon the preparative treatment applied to the substance. The type of conductance depends particularly on the choice of small traces of substitutional impurities that are added to, or contained in, the substance and cause lattice defects, i. e. disturb the perfection of the valence-bond structure. The term "carrier mobility" or "mobility" is generic to both types of conductance. That is, either the electron mobility or the hole mobility of the semiconductor material used for the purposes of my invention should have the high value of about 6000 cm$^2$/volt second or more. Generally, such a high mobility is needed for raising the desired effects to technically utilizable magnitudes or for securing a signal-to-noise ratio sufficient for reliably controlling an amplifier or other alternating-current device in response to the generated Hall voltage. The reason why in these respects the value of carrier mobility is critical will be understood from the following.

For any given condition of magnetic field strength, power supply in the primary electric circuit of the semiconductor, geometric dimensions and charge-carrier concentration, the Hall voltage increases with the carrier mobility of the substance used for the semiconductor. The practically available magnetic field strengths are limited. The field strength attainable with permanent magnets suitable for Hall generators is in the neighborhood of 10,000 gauss, and the practically attainable field strength of electromagnets is about 17,000 gauss, this limitation being due to the saturation characteristic of the ferromagnetic materials. As explained in my above-mentioned copending application Serial No. 468,099, a carrier mobility of about 6000 cm$^2$/volt second is needed for securing appreciable Hall effects with a magnetic field strength of 17,000 gauss; and a mobility of about 10,000 cm$^2$/volt second is needed for a field strength of about 10,000 gauss.

Elementary semiconductor substances such as silicon and germanium do not have such a high carrier mobility, the best obtainable mobility, namely that of germanium, being about 3000 cm$^2$/volt second. However, the required high carrier mobilities are available with semiconductor compounds.

A compound, in contrast to a homopolar element, aside from its homopolar component, has also a heteropolar component due to the chemical difference in the lattice elements. The superposition of homopolar and heteropolar components is appreciable.

The foregoing applies especially to binary compounds of the type $A_{III}B_V$, that is to compounds of an element of the third group in the periodic system with an element of the fifth group. Such compounds are described in the copending application of H. Welker for Semiconductor Devices and Methods of Their Manufacture, Serial No. 275,785, filed March 10, 1952, and assigned to the assignee of the present invention. The compounds of the $A_{III}B_V$ type comprises those of an element selected from boron, aluminum, gallium and indium with an element selected from nitrogen, phosphorus, arsenic and antimony. Examples of such compound are: AlN, AlP, AlAs, AlSb, GaN, GaP, GaAs, GaSb, InAs, InSb, BP. The semiconductor bodies made of these compounds may contain extremely slight traces of substitutional impurities. As a rule, for instance, a trace of tellurium or selenium produces n-type conductance, and a trace of cadmium, zinc or magnesium produces p-type conductance in $A_{III}B_V$ compounds. Especially notable among these compounds are InSb and InAs, both having carrier mobilities above 20,000 cm.$^2$/volt second.

An ancillary advantage of the high carrier mobility lies in the relatively good efficiency, i. e. ratio of secondary power output to primary power input, of such a "Hall generator." This efficiency is proportional to the square of the product of carrier mobility times magnetic field strength. For instance, with an indium antimonide semiconductor in a magnetic field of 10,000 gauss as mentioned above, an efficiency above 20% was attained.

The current supply terminals as well as the Hall electrodes are preferably joined with the semiconductor bodies by soldering. Clamping the terminals and electrodes to the semiconductor body is less preferable and is suitable only for small current outputs. It is advantageous to form the terminals and electrodes by electrolytically depositing a thin metal coating, for instance of copper or nickel, upon the proper places of the semiconductor body. The supply end electrode wires can then be attached to the coating by ordinary soldering with tin.

A Hall voltage generator according to my invention may be controlled by several variable input magnitudes. For instance, one control magnitude can be applied by varying the current intensity in the primary supply circuit of the semiconductor members. A second control magnitude can be applied by varying the strength of the magnetic field. A third control magnitude can be made effective by varying the position of the semiconductor member relative to the effective field zone of the magnet; and if a fourth control magnitude is to be effective it may act to vary the relative angular orientations of the semiconductor member and magnetic field. If a lesser number of controlling magnitudes is to be effective, then any desired smaller number of the above-mentioned four control possibilities may be chosen depending upon the requirements of the particular application. The Hall voltage can be reversed in polarity by reversing either the direction of the magnetic field or the direction of the primary current flowing through the semiconductor member. For instance, if the magnetic field is excited by alternating current, the Hall voltage is also alternating, and the generator may then serve as a modulator whose carrier frequency is determined by the alternating magnetic field and is modulated by the variations of the current flowing through the semiconductor member.

It will be apparent to those skilled in the art upon a study of this disclosure that the invention permits of various modifications and uses other than those specifically set forth, without departing from the essence of the invention and within the scope of the claims annexed hereto.

I claim:

1. A Hall-voltage generator, comprising a magnet structure having a magnetic field of a given direction, semi-conductor means disposed in said field, a primary circuit connected with said semiconductor means for supplying current thereto, said semiconductor means having a current flow direction transverse to said field direction, said semiconductor means having a plurality of pairs of Hall electrodes each pair being spaced from each other pair and each pair having its two electrodes spaced from each other in a direction transverse to both said field direction and said current-flow direction, said electrodes of one pair having in said current-flow direction a length different from that of the electrodes of each other pair to provide a Hall voltage of a field-responsive characteristic different from the characteristic of the Hall voltage of each other pair, and a secondary circuit selectively connected with one of said respective electrode pairs when the generator is in operation.

2. A Hall-voltage generator, comprising a magnet structure having a magnetic field of a given direction, a semiconductor member disposed in said field and having two terminals spaced from each other in a current-flow direction transverse to said field direction, a primary circuit connected to said terminal to pass current through said member, a plurality of pairs of Hall electrodes mounted on said member, said pairs being spaced from each other and from said terminals in said current-flow direction, the two electrodes of each pair being disposed on opposite sides respectively of said member and spaced from each other in a direction transverse to both said field direction and said current-flow direction, said electrodes of one pair having in said current-flow direction a length different from that of the electrodes of each other pair to provide a Hall voltage of a field-responsive characteristic different from the characteristic of the Hall voltage of each other pair, and a secondary circuit selectively connected with one of said respective electrode pairs when the generator is in operation.

3. A Hall-voltage generator, comprising a magnet structure having a magnetic field of a given direction, a semiconductor member, a plurality of semiconductor members disposed in said field, a primary circuit including said members and having therein a current-flow direction transverse to said field direction, each of said semiconductor members having a pair of Hall electrodes spaced from each other in a direction transverse to both said field direction and said current-flow direction, said electrodes of one pair of having in said current-flow direction a length different from that of the electrodes of each other pair to provide a Hall voltage of a field-responsive characteristic different from the characteristic of the Hall voltage of each other pair, and a secondary circuit selectively connected with one of said respective electrode pairs when the generator is in operation.

4. The apparatus defined in claim 1, the semiconductor means comprising indium antimonide.

5. The apparatus defined in claim 1, the semiconductor means comprising indium arsenide.

6. The apparatus defined in claim 1, the semiconductor means comprising an $A_{III}B_V$ binary semiconductor compound having a carrier mobility of at least 6000 cm.$^2$/volt second.

7. A Hall-voltage generator, comprising a magnet structure having a magnetic field of a given direction, a flat Hall plate member formed of a semiconductor compound having a minimum carrier mobility of about 6000 cm.$^2$/volt second, said member being disposed in said field and having its thickness extend substantially in said field direction, the thickness being less than the width and length, said member having two terminals spaced from each other in a current-flow direction transverse to said field direction, a primary circuit connected to said terminals to pass current through said member, two Hall electrodes disposed on said member in spaced relation to said terminals and spaced from each other in a direction transverse to both said current-flow direction and said field direction, a secondary circuit comprising a current-consuming load and being connected across said Hall electrodes to be energized therefrom, said Hall electrodes having an elongated shape the maximum dimension of which extends in said current-flow direction, the maximum dimension being of a length shorter than that of said plate member but larger than double the thickness of said member and at least one tenth the length of said member, whereby said Hall generator has a non-linear no-load voltage characteristic exhibiting more than proportional voltage increase with increasing field strength but has a substantially linear voltage characteristic when said secondary circuit is in operation.

8. A Hall-voltage generator, comprising a magnet structure having a magnetic field of a given direction, a semiconductor plate member of flat and elongated shape disposed in said field and having a thickness less than its width and a length greater than its width, its thickness extending in said field direction and its length and width extending transverse to said field direction, said member comprising an $A_{III}B_V$ semiconductor compound having a minimum carrier mobility of about 6000 cm.$^2$/volt second, two terminal means mounted at the two respective ends of the length of said elongated member, a primary circuit connected to said terminals to pass current lengthwise through said member, two Hall electrodes mounted on said member in spaced relation to said terminals and spaced from each other across the width of said member, a secondary load circuit connected across said Hall electrodes to be energized therefrom, said Hall electrodes having elongated area contact with said member, being elongated in length lengthwise of said member, the length of said Hall electrodes being greater than the width of said plate member but shorter than the length of said plate member and at least one tenth the length of said member, whereby said Hall generator has a non-linear no-load voltage characteristic exhibiting more than proportional voltage increase with increasing field strength but has a substantially linear voltage characteristic when said secondary circuit is in operation.

9. A Hall-voltage generator, comprising a magnet structure having a magnetic field, an excitation winding on said structure and a variable-current circuit connected to said winding for varying the strength of said field, said structure having decreasing permeability over a range of increasing values of said field strength, a flat plate semiconducting member having a thickness less than its width and of a length greater than its width disposed in said field, said member comprising an $A_{III}B_V$ semiconductor compound having a minimum carrier mobility of about 6000 cm.$^2$/volt second, two current terminals on said member spaced from each other lengthwise of said member, to provide current-flow lengthwise of the member and transverse to said field direction, a primary circuit connected to said terminals to pass said current through said member, two elongated Hall electrodes mounted on, and with their lengths extending along, the narrow longitudinal sides of said member in spaced relation to said terminals so as to be spaced from each other in a direction across said width and transverse to both said current-flow direction and said field direction, a secondary load circuit connected across said electrodes to receive current therefrom, the length of said Hall electrodes being greater than the thickness of, and at least one tenth of but shorter than the length of, said member and having their length direction extending parallel to said current-flow direction, and said secondary circuit having within said range of field-strength values a Hall voltage which due to said elongated eletcrode shape has a non-linear no-load voltage characteristic exhibiting more than proportional voltage increase with increasing field strength but which is substantially proportional to said field-strength values when said secondary load circuit is in operation.

References Cited in the file of this patent

UNITED STATES PATENTS

| | | |
|---|---|---|
| 2,649,574 | Mason | Aug. 18, 1953 |
| 2,714,182 | Hewitt | July 26, 1955 |
| 2,736,822 | Dunlap | Feb. 28, 1956 |